United States Patent [19]

Olsen et al.

[11] Patent Number: 4,669,316

[45] Date of Patent: Jun. 2, 1987

[54] DIFFERENTIAL-PRESSURE APPARATUS EMPLOYING A RESONANT FORCE SENSOR

[75] Inventors: Everett O. Olsen, Wrentham; Anthony C. Gilby, Foxboro; Gordon W. Chitty, Norfolk; Vernon C. Westcott, Lincoln, all of Mass.

[73] Assignee: The Foxboro Company, Foxboro, Mass.

[21] Appl. No.: 859,645

[22] Filed: May 5, 1986

[51] Int. Cl.[4] .......................... G01L 7/06; G01L 7/08; G01L 9/14; G01L 13/02
[52] U.S. Cl. ...................................... 73/702; 73/717; 310/338
[58] Field of Search .................. 73/702, DIG. 2, 704, 73/DIG. 5, 862.59, 716, 722, 717, 720, 721; 310/338, 328, 370, 339

[56] References Cited

U.S. PATENT DOCUMENTS 3,266,319  8/1966  Holmes ................................. 73/704
4,299,122  11/1981  Toshitsugu ....................... 73/862.59

FOREIGN PATENT DOCUMENTS

0830163  5/1981  U.S.S.R. ................................. 73/702

Primary Examiner—Donald O. Woodiel
Attorney, Agent, or Firm—Parmelee, Bollinger & Bramblett

[57] ABSTRACT

Differential-pressure measuring apparatus comprising a casing providing a closed chamber filled with fluid and divided into two sections by a pressure-responsive element. The input pressures are applied to the two chamber sections respectively to develop a corresponding force on the pressure-responsive element. A sealed evacuated housing of non-magnetic material is in one chamber section and contains a double-tuning-fork (DTF) the resonant frequency of which varies with longitudinal tension force applied to the DTF. The force developed by the pressure-sensitive element is coupled by magnetic elements through the wall of the housing and to the DTF so as to control the resonant frequency of the DTF in accordance with the differential pressure to be measured. The DTF is activated to produce an output signal reflecting the differential pressure.

32 Claims, 8 Drawing Figures

DIFFERENTIAL-PRESSURE APPARATUS EMPLOYING A RESONANT FORCE SENSOR

BACKGROUND OF THE INVENTION

A. Field of the Invention

This invention relates to the measurement of differential pressure. More particularly, this invention relates to such measurements made by use of a resonant sensor developing an output signal the frequency of which is responsive to an applied differential pressure.

B. Description of the Prior Art

Differential pressures have been measured for many years, in large part for the purpose of determining fluid flow rates in industrial processes by measuring the differential pressure produced across an orifice plate in a flow pipe. Such measurements typically are made by apparatus commonly referred to as a differential-pressure cell, of which there are a number of different types.

One type of differential-pressure cell, which has gone into widespread commercial use, employs a vibrating wire tensioned by a force corresponding to the differential pressure so that the resonant frequency of vibration of the wire reflects the magnitude of the differential pressure (see U.S. Pat. No. 4,165,651 to E. O. Olsen et al). The wire vibration is detected by electronic circuitry which develops a corresponding output signal suitable for transmission to a remote location such as a control station or the like. One important advantage of such resonant sensors is that the output signal can be developed directly in pulse format, and thus can readily be adapptted to digital circuitry which now is coming to be used extensively in instrumentation systems.

Differential pressure cells for commercial application must be capable of making measurements at quite high static (common mode) pressures, e.g. up to 6000 psi. Commonly, to measure such high pressures, the apparatus comprises a capsule forming a liquid-filled chamber having its ends sealed by pressure-responsive diaphragms which couple the process pressures to the interior of the chamber. The sensing element (e.g. the vibrating wire in the above U.S. Pat. No. 4,165,651) is in the fill-liquid capsule, and the differential pressure coupled through the diaphragms develops a corresponding stress on the sensing element. The fill-liquid is essentially incompressible, and withstands the high static pressures involved without allowing damage to the flexible diaphragms or the like used to transmit the differential pressure through to the sealed interior chamber.

The vibrating-wire resonant element described in the above-mentioned U.S. Pat. No. 4,165,651 is capable of operating in a fill-liquid without serious adverse effects resulting from the presence of the liquid around the transversely vibrating wire. However, its performance would be improved if not surrounded by a liquid. Moreover, other types of resonant elements, such as certain resonant beams or tuning forks having important advantages as sensing elements, will not perform satisfactorily when surrounded by liquid. Thus, there are benefits to be obtained by operating vibratory sensing elements of a differential-pressure cell in a vacuum, or at least in a gaseous medium at a low pressure such as atmospheric. Among such benefits is that of making it possible to employ as sensing elements the recently available miniaturized vibratory beams formed by photolithographic processes, e.g. the resonant element known as a double-tuning fork (DTF). For further information on such resonant elements, reference may be made to U.S. Pat. Nos. 4,215,570 and 4,372,173.

If the resonant element is to be in vacuum, or in a gaseous medium at low pressure, then it must be isolated from the high process pressures by some form of pressure-resistant barrier. Thus, the flexible pressure-responsive transmitting devices such as diaphragms, previously used to couple forces to a sensing element in the interior chamber of a liquid-filled capsule, can no longer be used for that purpose. That is, it becomes necessary to employ other than conventional flexible means for transmitting the applied differential pressure through a barrier to the sensing element.

The differential-pressure instrument also preferably should be arranged to accommodate optical excitation and read-out of the resonant element. Such arrangements (see for example, U.S. Pat. No. 4,521,684 to Gilby et al) are very well suited for use with the tiny beam-like resonantors now becoming available, and which may make possible the development of greatly superior, minaturized measuring apparatus for industrial processes.

SUMMARY OF THE INVENTION

In accordance with a preferred embodiment of the present invention, differential-pressure measuring apparatus is provided wherein the sensing element (e.g. a tiny resonant beam or tuning fork) is in a pressure-resistant capsule the interior of which is isolated from the high static process pressures by a non-magnetic barrier, and wherein magnetic means are employed to transmit through that barrier a force corresponding to the differential pressure to be applied to the sensing element. The invention contemplates that different types of magnetic coupling arrangements can be employed for this purpose.

Preferably, the magnetic coupling operates through means providing a balance between the differential-pressure force and the oppositely-directed magnetic force applied to the resonant element. In this arrangement, the transmitted magnetic force automatically rises (or falls) an amount equal to the change in force developed externally of the capsule by the differential pressure to be measured, so as to continually balance that change in force. With a strong magnet having a suitable gradient of magnetic field intensity (i.e. providing a strongly inhomogeneous magnetic field), such a force-balance arrangement can operate successfully over the full range of forces required with only very small motions of the associated components. Such a force-balance arrangement thus minimizes errors, e.g. which otherwise could occur with so-called position-balance arrangements wherein an applied force is opposed by a range spring or the like to produce a deflection proportional to the applied force. Thus, with a force-balance arrangement, there will be no errors resulting from changes in range spring characteristics due to changes in temperature, aging, and so on.

Other objects, aspects and advantages of the invention will in part be pointed out in, and in part apparent from, the following detailed description considered together with the accompanying drawings.

BRIEF DESCRIPTION OF THE DRAWINGS

FIG. 1 is a horizontal section of a double-tuning-fork (DTF) force sensor mounted in a sealed housing and forming part of a DP cell; FIG. 1 is a section taken along line 1—1 of FIG. 2;

FIG. 2 is a left-hand-end elevation view of the structure of FIG. 1;

DESCRIPTION OF PREFERRED EMBODIMENTS

Figures 1, 2:
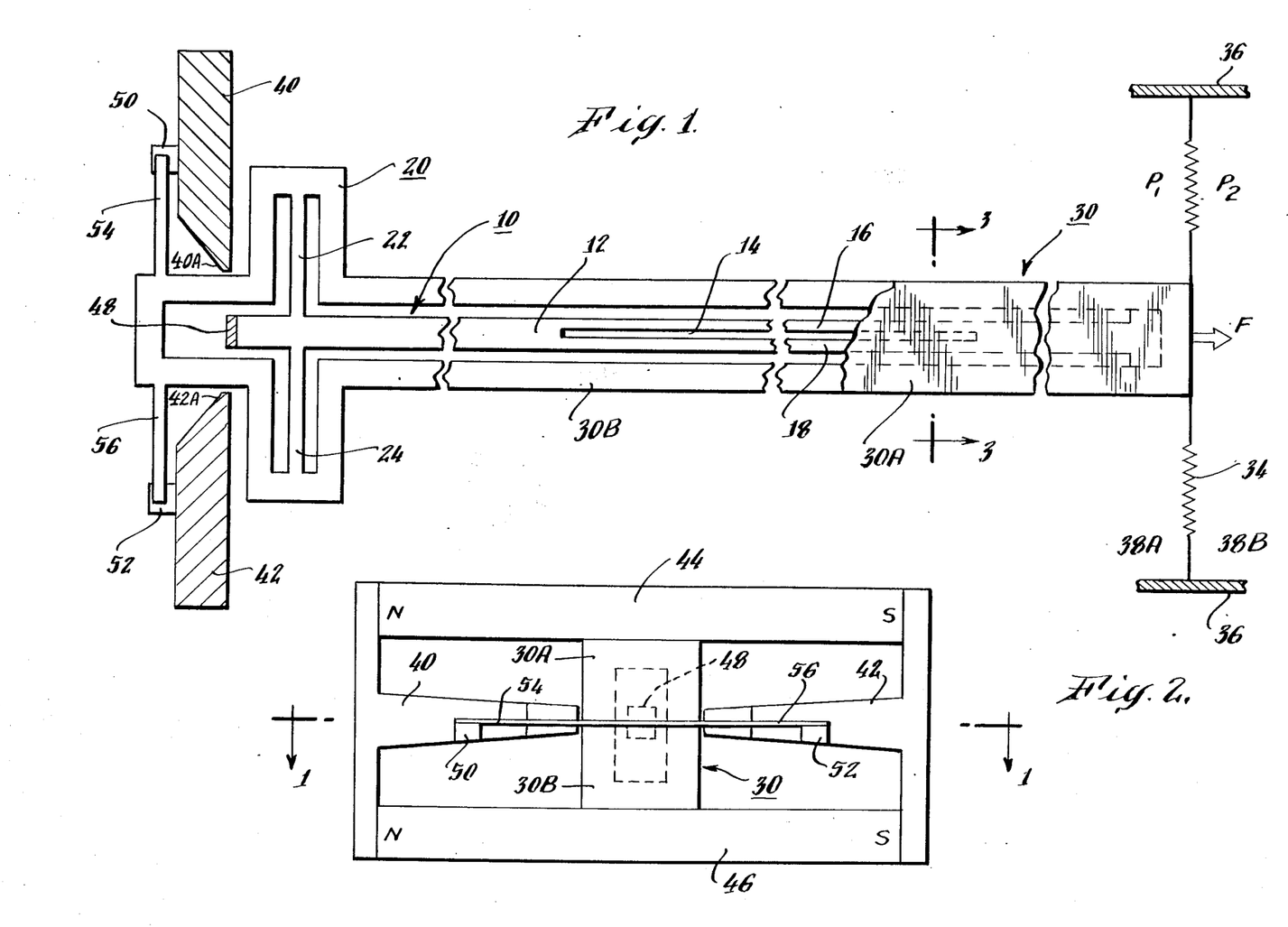

Referring now to FIG. 1, there is shown a force transducer comprising a generally cross-shaped structure 10 capable of being formed by known photolithographic etching processes from a thin wafer, e.g. of quartz or fused silica, using the so-called planar forming techniques particularly well known in the semiconductor industry. The inner elongate section 12 of the structure 10 is formed with a slot 14 to define a double-tuning-fork (DTF) such as described in U.S. Pat. No. 4,215,870, comprising a pair of parallel tines 16, 18 joined at their ends. The structure 10 is quite small, for example having an overall length of about 0.880", a slot of 0.404" in length by 0.003" in width, tines 0.004" wide, and a wafer thickness of 0.002".

Etched integrally with the DTF 12, i.e. from the same wafer, is a surrounding frame 20 having the same thickness as the DTF. The right-hand end of the DTF is joined directly to this frame. The left-hand end is supported by flexure supports 22, 24 etched with the DTF, and which extend out transversely to join the surrounding frame. These supports keep the DTF centered in the frame, yet allow for small longitudinal movement of the DTF body as will be explained.

The double-tuning fork (DTF) 12 may be likened to two conventional tuning forks secured end-to-end. When activated in known fashion, the tines of the DTF vibrate laterally at a resonant frequency which is a function of the longitudinal stress applied to the body of the DTF. These vibrations can have a very high Q, so that only minute amounts of energy need to be supplied to the device to maintain its vibratory movement. Such high Q results in extremely high sensitivity of changes in resonant frequency in response to variations in the applied stress.

In earlier versions of such tuning forks, the activating energy was applied through metallic electrodes formed on the DTF body and connected to an external oscillator. The resonant frequency of the sensor was detected by frequency-responsive circuitry coupled to the oscillator. In the preferred embodiment described herein, the DTF is activated by optical energy supplied through fiber optic devices (not shown in FIG. 1); similarly, the frequency of vibration is detected by fiber optic devices coupled to the DTF.

Figure 3:
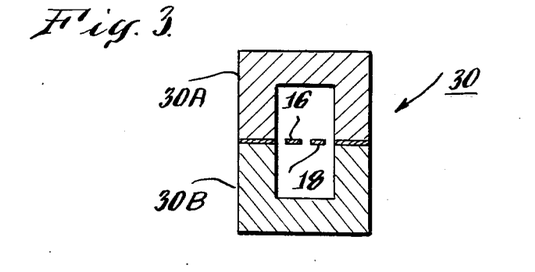
FIG. 3 is a cross-section taken along line 3—3 of FIG. 1.

Referring now also to FIGS. 2 and 3, the DTF 12 is sealed within a box-like housing generally indicated at 30, and comprising upper and lower sections 30A and 30B above and below the DTF. The side walls of these housing sections have a thickness exactly matching the width of the frame 20, and are shaped to follow the layout of that frame. The frame and housing are sealingly secured together, to permit the interior of the housing to be permanently evacuated so that the DTF 12 can vibrate without interference. The housing preferably is formed from the same material as the DTF 12, e.g. by etching. This material preferably is transparent quartz so that optical powering and sensing can be provided directly through the wall.

Reverting to FIG. 1, the right-hand end of the DTF 12 is fastened to the center of a pressure-responsive element 34 schematically indicated as a conventional slack measurement diaphragm of circular outline. The outer edges of this diaphragm are secured to a pressure casing 36, shown only in fragmentary form in order to simplify the drawing. The diaphragm 34 divides the interior chamber of this casing into two sections generally indicated at 38A, 38B (but not shown completely in FIG. 1), both containing a fill-liquid such as a silicone oil. These chamber sections are, in turn, coupled respectively through conventional slack isolation diaphragms (not shown) to respective process fluids having pressures $P_1$ and $P_2$, with $P_1$ higher than $P_2$. For example, $P_1$ and $P_2$ may be the upstream and downstream pressures across an orifice plate inserted in a stream of flowing fluid.

The process pressures $P_1$ and $P_2$ are communicated through the isolation diaphragms to the fill-liquid in the respective chamber sections, as indicated on the drawing. The differential pressure between $P_1$ and $P_2$ develops a force tending to move the diaphragm 34 and the DTF 12 to the right. This force is indicated schematically as an arrow F at the center of the measurement diaphragm.

Adjacent the left-hand region of the DTF 12, but outside of the housing 30, are two pole pieces 40, 42 (see also FIG. 2) forming part of a magnetic system including a pair of permanent magnets 44, 46. The ends of the pole pieces nearest the housing are tapered on one side to provide a relatively narrow offset tip 40A, 42A. These pole pieces produce in the gap therebetween a very strong magnetic field. Since the housing 30 is of non-magnetic material, this field extends into the interior of the housing, concentratedly in the region occupied by the left-hand end of the DTF. This magnetic field is deliberately made to be highly inhomogeneous, as by means of the tapered pole piece tips, so as to provide a large gradient in the longitudinal direction along the axis of the DTF. Additional information about such high-strength magnet systems may be found in U.S. Pat. Nos. 4,047,814 and 4,187,170 issued to Vernon C. Westcott on Sept. 13, 1977 and Feb. 5, 1980, respectively.

Figure 4:
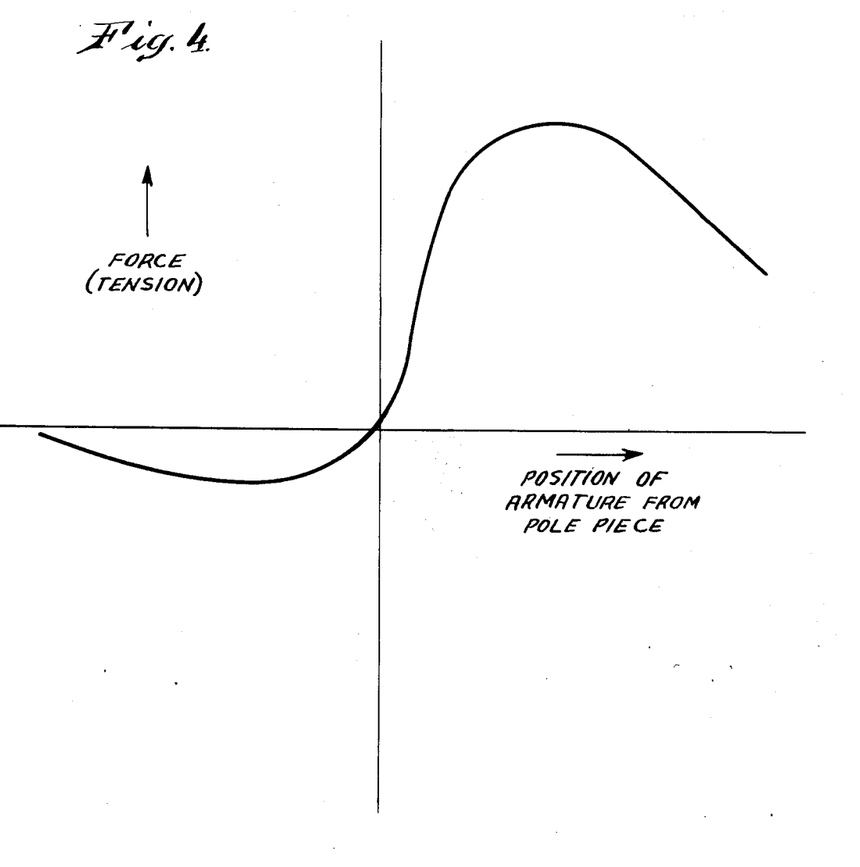
FIG. 4 is a graph showing the variation of force transmitted to the sensor as a function of the longitudinal position of the armature.

The left-hand end of the DTF 12 is provided with an armature 48 formed of magnetic material arranged to interact with the magnetic field from the pole pieces 40, 42. As a result of the steep gradient of the field, when the armature is moved slightly to the right of a longitudinally central position between the pole piece tips, the field develops on the armature a large force tending to move the armature to the left, i.e. in a direction opposing the force F developed by the measurement diaphragm 34. The graph of FIG. 4 shows that the magnitude of this magnetically-induced force is very large for only small movements of the armature away from its initial position where the force is zero.

The armature 48 may be formed in various ways, for example by vacuum deposition of suitable metallic particles, possibly augmented by electroplating to build up its thickness substantially above and below the surface of the DTF 12 (as shown in FIG. 2). The magnetic system comprising the pole pieces 40, 42 and magnets 44, 46 is firmly secured to the pressure casing 36 (i.e. mechanical ground) by conventional means (not shown). The pole pieces carry tabs 50, 52 to which are secured support flexures 54, 56 formed integrally with the DTF 12, i.e. etched from the same wafer as the DTF. It will be evident that various ways can be devised for securing the DTF to the magnetic system, depending upon requirements of the specific application.

In operation, when the differential pressure $P_2 - P_1$ increases (see FIG. 1), it pulls the housing 30 with the DTF 12 to the right, causing the armature 48 to move away from its central position between the pole pieces 40, 42. The magnetic field from these pole pieces acts on the armature, creating a restraining force tending to hold the DTF in its original position. Ultimately, the DTF will move a distance sufficient to developing a restraining which exactly balances the differential-pressure force. At that point, the structure of the DTF will be tensioned an increased amount corresponding to the new differential pressure, and the resonant frequency of the DTF will be altered correspondingly. Detection of the resonant frequency, as by conventional means described in the prior art, will provide an accurate measure of the applied differential pressure.

The amount of movement of the DTF 12 to reach the new force-balance position as described above will be small, for example, only a few thousandths of an inch. Achievement of a balance of forces with such small movement is very important, since it makes possible significant reduction in the errors that otherwise could be introduced, e.g. as a result of variations in external conditions such as temperature, aging, and so on. Also, such small movement makes it possible to reduce significantly the volume of liquid-fill required in the interior of the instrument, thereby further enhancing measurement accuracy.

Figure 5:
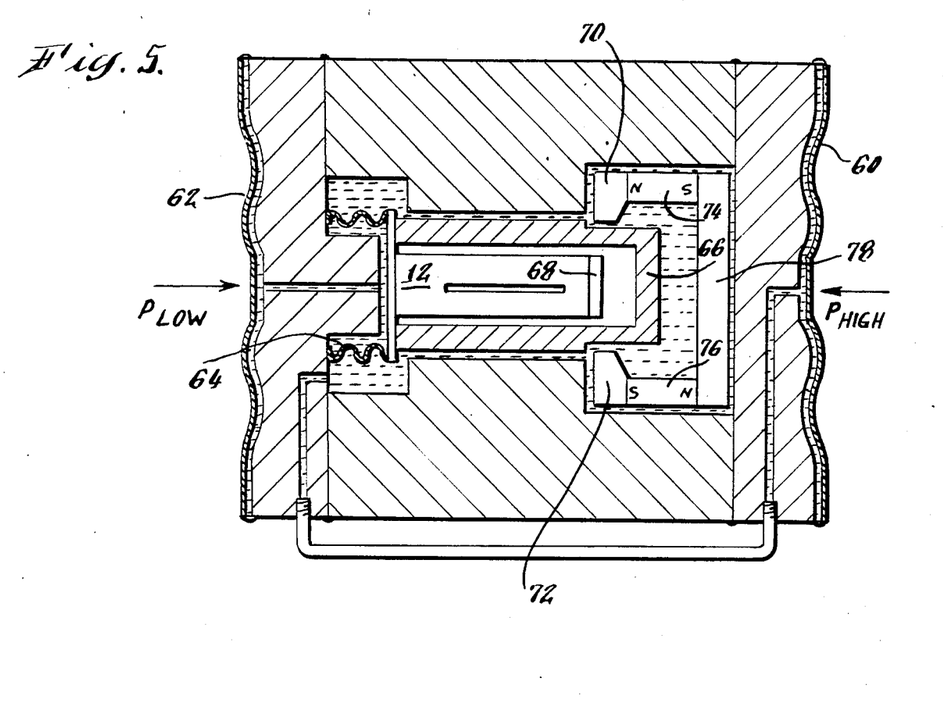
FIG. 5 is a longitudinal section illustrating a DP cell including a differential-pressure-responsive bellows for moving a DTF sensor relative to a magnet which develops a restraining force for the sensor; Note: various parts in this and subsequent figures are shown schematically, and are not, to scale for a commercial implementation.

Referring now to FIG. 5, there is shown another differential-pressure transmitter comprising a force-sensing DTF element 12 such as that described above. In this arrangement, the applied pressures $P_{HIGH}$ and $P_{LOW}$ are shown coupled to the respective sections of an interior liquid-filled chamber by means of slack isolation diaphragms 60, 62. A bellows 64 in this chamber develops a force responsive to the differential pressure, and applies this force to the left-hand end of a sealed and evacuated housing 66 formed of non-magnetic material, containing the resonant element. This housing may for example have a circular cross-section.

The right-hand end of the DTF element 12 carries an integral armature 68 (such as described above). This end is shown to be free, as in a cantilever resonant beam configuration, but for practical reasons it will be desirable to provide physical supports for the right-hand end, e.g. flexures or the like, to maintain the armature centered with respect to the longitudinal axis of the housing 66.

The armature 68 is positioned between a pair of pole pieces 70, 72 forming part of a magnetic system including permanent magnets 74, 76 and a bar of magnetic material 78 to complete the magnetic circuit. The magnetic field produced by the pole pieces 70, 72 is, as described above with reference to FIG. 1, strongly inhomogeneous, and has a large gradient in a direction parallel to the axis of the sealed housing 66. This field extends into the region occupied by the armature 68, since the housing 66 is non-magnetic. Thus, as the differential pressure $P_{HIGH} - P_{LOW}$ increases, tending to move the housing with the resonant element 12 to the left, the inhomogeneous magnetic field will interact with the armature to develop a restraining force tending to prevent such movement. Ultimately, the resonant element will reach a new position, slightly to the left, where the new differential-pressure force is exactly balanced by the increased restraining force. At this new position, the tension in the resonant element will have been increased an amount corresponding to the increase in the differential pressure. As a result, the resonant frequency of element 10 will correspondingly be changed, and the new resonant frequency can be detected by conventional means to provide an accurate measure of the new differential pressure.

Figure 6:
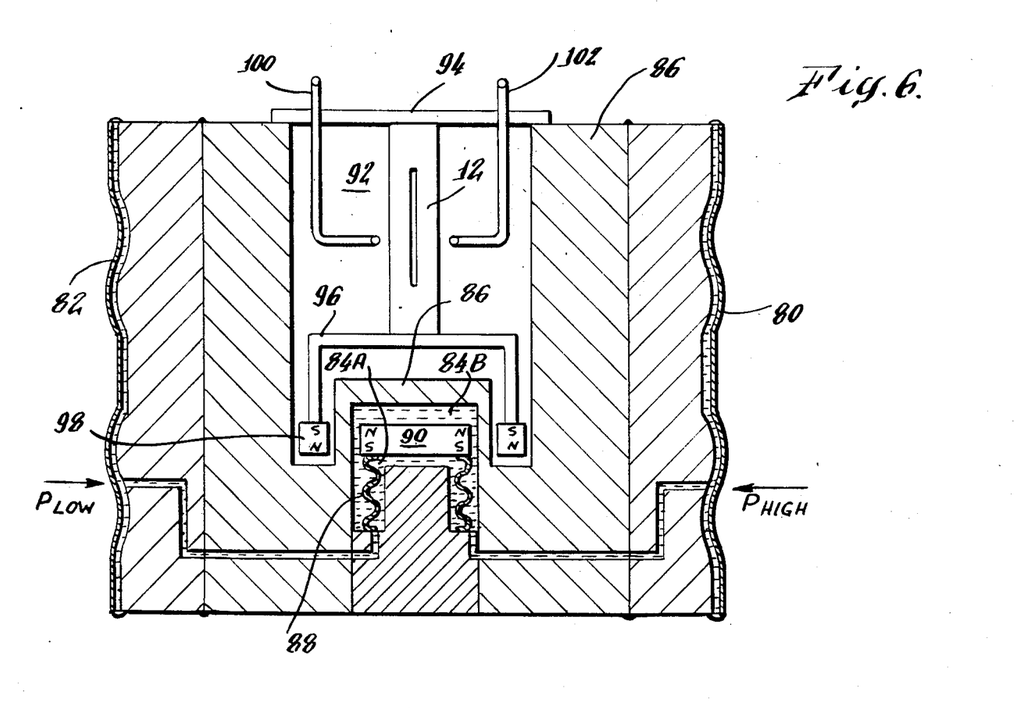
FIG. 6 is a longitudinal section illustrating a DP cell including a bellows for moving a magnet which transmits a force to a pressure-isolated DTF.

Referring now to FIG. 6, there is shown still another differential-pressure transmitter. As in the FIG. 5 arrangement, the applied pressures $P_{HIGH}$ and $P_{LOW}$ are shown coupled by means of slack isolation diaphragms 80, 82 to respective sections 84A, 84B of an interior liquid-filled chamber formed in a pressure casing 86. A bellows 88 in this chamber develops a force responsive to the differential pressure. The instrument casing 86 is circular in cross-section.

The transmitter design of FIG. 6 differs from that of FIG. 5 in that the force of the bellows 88 is applied directly to a disc-shaped permanent magnet 90 which is mounted for movement at the end of the bellows. The differential pressure in the bellows applies a corresponding force to the magnet, so as to control its movement.

The instrument casing 86 is constructed to form yet another interior chamber 92 which is evacuated and contains a resonant DTF element 12 like that described above. The upper end of this chamber is sealed by a cover plate 94 to which the upper end of the DTF is anchored. The lower end of the DTF carries a support 96 which is U-shaped in cross-section, and carries at its lower extremity a ring-shaped permanent magnet 98. This magnet is coupled magnetically through the instrument casing 86 to the magnet 90. The casing 86 (or the portions thereof between the magnets 90, 98) is formed of non-magnetic material to accommodate such intercoupling.

When there is an increase in the applied differential pressure $P_{HIGH} - P_{LOW}$, the magnet 90 is urged downwardly by the bellows 88. The resulting movement is coupled magnetically to the magnet 98, applying a downwardly-directed force thereto. This force, in turn, is applied to the DTF 12 in a longitudinal direction, increasing the tension in the DTF.

With strong magnets 90, 98 and tight coupling between those magnets, the movements of the magnets will track quite closely. The downward movement of the magnet 98 will of course be restrained by the spring reaction force of the DTF 12 (in accordance with its modulus of elasticity), and this restraining force will be coupled back to the movable magnet 90 to which the force of bellows 68 is applied, opposing and ultimately balancing that bellows force. Thus, the increase in tension in the DTF will correspond nearly exactly to the new differential pressure. Consequently, the DTF will resonate at a new frequency providing an accurate measure of the changed differential pressure.

Fiber optic devices 100, 102 are shown in FIG. 6 to illustrate that such devices can be used both for powering the DTF 12, and for detecting the resonant frequency thereof. Other more conventional means of powering the DTF and reading out the resonant frequency can of course be used, in accordance with known prior art techniques.

Figure 7:
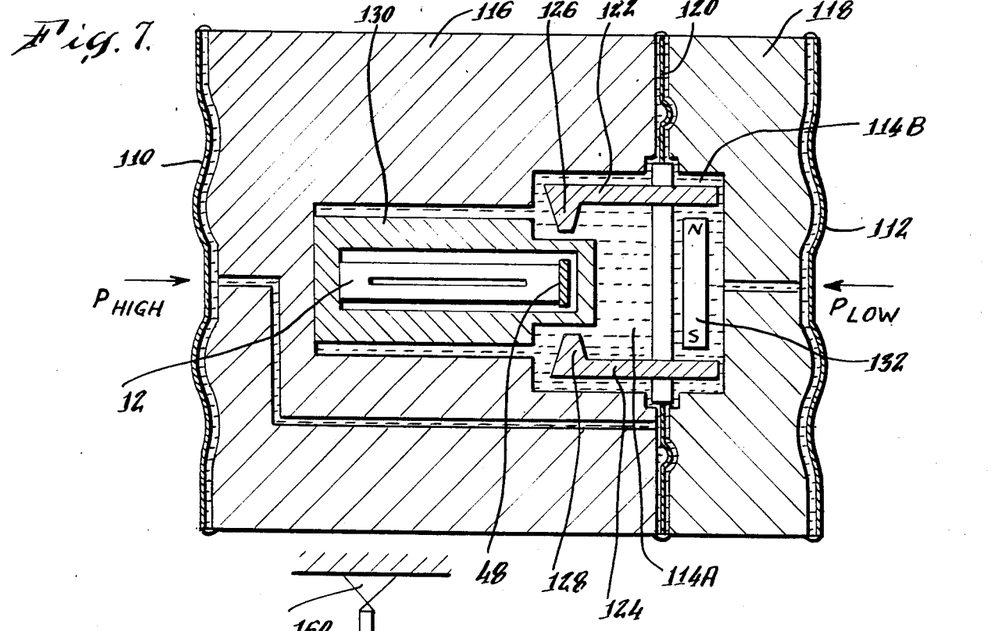
FIG. 7 is a longitudinal section illustrating a DP cell including a differential-pressure-responsive diaphragm for moving a magnetic armature arranged to transmit force magnetically through a pressure barrier to a DTF having one end fixed in position.

Referring now to FIG. 7, there is shown a differential-pressure transmitter somewhat similar to that of FIGS. 5 and 6, in that the process pressures $P_{HIGH}$ and $P_{LOW}$ are applied through slack isolation diaphragms 110, 112 to respective sections 114A, 114B of a liquid-filled chamber formed by two pressure casing means 116, 118. In FIG. 7, however, a measurement diaphragm 120 in the chamber is used rather than a bellows to develop a force responsive to the differential pressure.

The diaphragm 120 carries a pair of magnetic armatures 122, 124 formed at the left-hand ends thereof with pole pieces 126, 128. These pole pieces are positioned on opposite sides of a sealed evacuated housing 130 formed of non-magnetic material. Between the other ends of the armatures 122, 124 is mounted a strong permanent bar magnet 132, secured to the pressure casing 118 (i.e. to mechanical ground). This magnet is magnetically coupled to the ends of the armatures 122, 124, and produces an intense inhomogeneous magnetic field between the pole pieces 126, 128.

The housing 130 is secured at its left-hand end to an end wall of chamber section 114A. The housing contains an elongate resonant element, e.g. a DTF 12 as described above, which is fastened at its left-hand end to the inner surface of the housing. The DTF is formed at its right-hand end with a magnetic armature 48 such as described above. This armature is normally positioned directly between the pole pieces 126, 128, within the inhomogeneous magnetic field developed by the magnetism of the bar magnet 132.

When there is an increase in the differential pressure $P_{HIGH}-P_{LOW}$, the measurement diaphragm 120 is urged to the right, carrying the armature members 122, 124 with it. This shifts the magnetic field between the pole pieces 126, 128 to the right, thereby developing force on the armature 48 tending to move it to the right. This in turn applies an increased longitudinal tension force to the DTF 12. The springiness (elasticity) of the DTF resists this increased force, so that there is very little net movement of the armature 48, but stretching the DTF a small amount. The spring restraining force developed by the DTF is effectively coupled to the pole pieces 126, 128 by the armature 48, preventing any large movement of the diaphragm 120.

The increased tension in the DTF 12 alters its resonant frequency correspondingly. This increased tension corresponds closely to the increased differential pressure, so that the change in resonant frequency will provide an accurate measure of the change in differential pressure.

It may be noted that in the FIG. 7 embodiment, the differential pressure is not required to move a relatively heavy object, such as a permanent magnet, and instead is required only to move the relatively light armatures. This arrangement thus minimizes certain types of errors such as inclinometer errors. Also, with this arrangement there is very little movement of the resonant element 12, thus making it more readily possible, for example, to use fiber optic devices for powering the resonant element and reading out its resonant frequency.

In the above-described embodiments, the force coupling through the non-magnetic housing was effected by devices which magnetically attracted one another. However, it is possible to use magnetic devices which repel one another.

Figure 8:
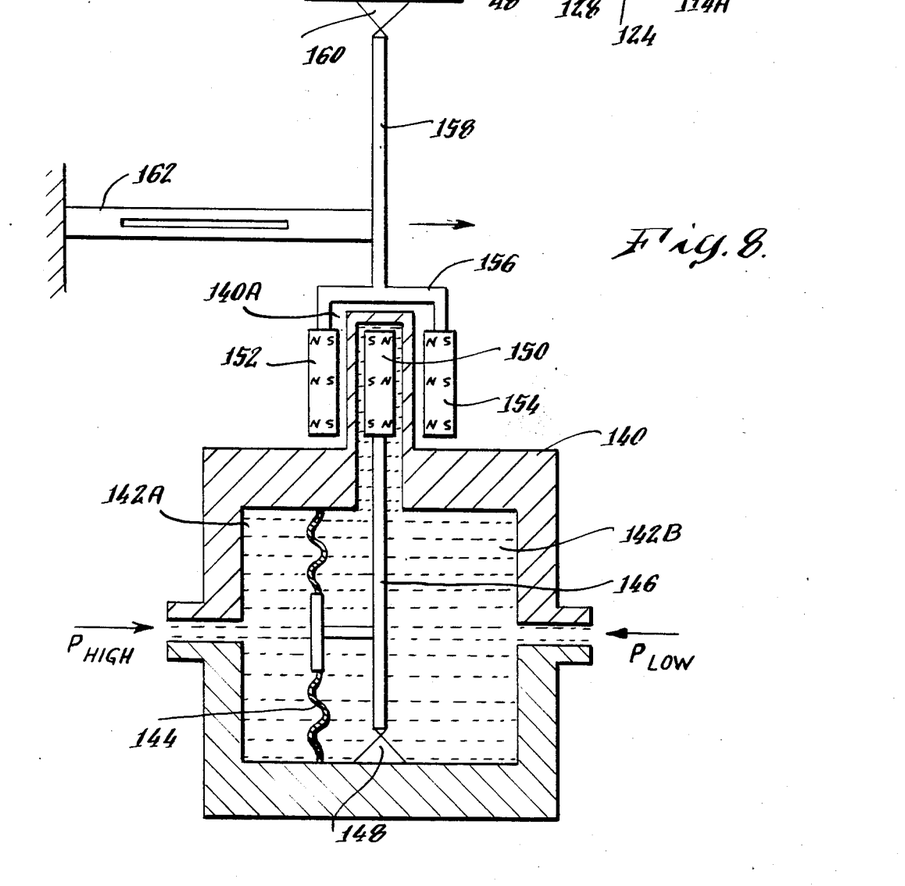
FIG. 8 is a schematic diagram illustrating one arrangement for transmitting force through a pressure barrier by means of magnets developing repelling forces.

Referring now to FIG. 8, there is shown a pressure casing 140 having an inner chamber divided into two sections 142A, 142B by a flexible diaphragm 144. Fluids under pressures $P_{HIGH}$ and $P_{LOW}$ are directed to these chamber sections, tending to move the diaphragm to the right. The central portion of the diaphragm is connected to a vertical arm 146 pivoted at its lower end by a flexure 148 and carrying at its upper end a cylindrical permanent magnet 150 (e.g. a rare earth).

Outside of the casing 140 are two permanent magnets 152, 154 carried by a U-shaped support 156 at the lower end of a second vertical arm 158 pivoted at its upper end by a second flexure 160. The casing 140 (or at least the upper portion 140A between the magnets) is constructed of non-magnetic material to permit magnetic interaction between the magnets, so as to couple forces between the two vertical arms 146, 158. The arm 158 is connected just above the support 156 to a horizontal resonant element 162, such as the DTF described above, and having its left-hand end secured to mechanical ground to provide for tensioning the DTF by a rightward-directed force from the arm 158.

The two outer magnets 152, 154 are identical to the inner magnet 150, and are positioned on opposite sides of the inner magnet, parallel thereto and vertically aligned. These three magnets are polarized horizontally and their north and south poles are arranged (as shown) so that the north pole of the inner magnet is directly opposite the north pole of one of the two outer magnets, and the south pole of the inner magnet is directly opposite the south pole of the other outer magnet. Thus, magnets 150, 152 repel one another, and similarly, magnets 150 and 154 repel one another. It will be evident that the magnetic forces act to maintain the inner magnet 150 positioned equidistantly from the two outer magnets.

When the lower arm 146 and the inner magnet 150 are moved to the right by an increase in differential pressure, the repelling magnetic forces between the three magnets develop a following action, causing the upper arm 158 similarly to move to the right. This increases the tension in the resonant element 162 and changes its resonant frequency correspondingly. The increased longitudinal force on the resonant element is resisted by the spring elasticity of that element, and ultimately a balance of forces is reached, as described above. At that balance point, the new resonant frequency of the element 162 will provide a measure of the new differential pressure.

The FIG. 8 configuration is not intended to represent a practical design for a differential-pressure instrument, but only to illustrate the principle of employing repelling magnetic forces for coupling a differential-pressure force through a sealed pressure housing. A practical design for such an instrument would be quite different from that shown.

Many variations on the designs shown in FIGS. 1–7 are possible, within the scope of this invention. For example, although flexible pressure-responsive devices such as diaphragms are shown between the high and low process pressures, other arrangement can be used. Thus, instead of a bellows or diaphragm, a piston-like element could be employed. Such an element could be supported for sliding axial movement between the high and low fluid pressure compartments, and sealed against leakage of the process fluid pressures by suitable packing means. For example, the outer surface of the piston could be provided with a magnetic fluid, activated by a magnetic field developed by adjacent pole pieces. Magnetic fluid also could be used to support the movable (i.e. non-grounded) end of a DTF as in the FIG. 1 configuration, rather than, or in supplement to, flexures as shown in FIG. 1. Still other variations will be evident to those skilled in this art.

Accordingly, although specific preferred embodiments have been described hereinabove in detail, it is to be understood that this has been for the purpose of illustrating the invention, and should not be considered as necessarily limitative of the invention, since many modifications can be made by those skilled in the art while still practicing the invention claimed herein.

What is claimed is:

1. Differential-pressure measuring apparatus comprising:
   sensing means including a resonant element having a resonant frequency which varies with changes in force applied to said element;
   a sealed housing having at least a portion thereof formed of non-magnetic material and enclosing said resonant element;
   pressure-responsive means outside of said housing to develop a force corresponding to a differential pressure to be measured; and
   magnetic means operable with said pressure-responsive means to transmit through said non-magnetic portion of said sealed housing and apply to said resonant element a force responsive to the force developed by said pressure-responsive means, thereby to control the resonant frequency of said element in accordance with said differential pressure.

2. Apparatus as in claim 1, wherein said housing is surrounded by a casing providing a closed chamber containing a fluid under pressure;
   said pressure-responsive means being in contact with said fluid to receive said differential pressure.

3. Apparatus as in claim 2, wherein said housing is evacuated.

4. Apparatus as in claim 3, wherein said pressure-responsive means divides said chamber into two sections;
   said differential pressure being developed across said pressure responsive means.

5. Apparatus as in claim 4, wherein said pressure-responsive means is a diaphragm.

6. Apparatus as in claim 4, wherein said pressure-responsive means is a bellows.

7. Apparatus as in claim 1, wherein said magnetic means comprises an armature of magnetic material secured to said resonant element.

8. Apparatus as in claim 7, wherein said magnetic means comprises a magnet external of said housing and operable with said armature to apply force to said resonant element.

9. Apparatus as in claim 1, wherein said resonant element is elongate and receives said corresponding force at the ends thereof.

10. Apparatus as in claim 9, wherein said elongate element is a rigid structure subject to transverse vibrations at said resonant frequency.

11. Apparatus as in claim 10, wherein said rigid element is cantilever-mounted at one end thereof to said housing.

12. Apparatus as in claim 11, wherein said rigid element carries a magnetic armature remote from the end thereof secured to said housing;
    said armature forming part of said magnetic means for transmitting force through said sealed housing.

13. Apparatus as in claim 12, wherein said armature is at the free end of said cantilever-mounted element.

14. Apparatus as in claim 12, including flexure means secured to said resonant element to accommodate longitudinal movement while restraining transverse movement of said armature.

15. Apparatus as in claim 12, wherein said magnetic means further comprises a magnet outside of said housing and operable with pole pieces for developing an inhomogeneous magnetic field in the region of said armature to apply force to said armature.

16. Apparatus as in claim 15, wherein said pressure-responsive means is coupled to said sealed housing to apply thereto a force tending to move said housing in a direction to shift said armature out of said magnetic field;
    the force developed by said magnetic field restraining such movement of said armature and thereby producing said corresponding force in said resonant element.

17. Apparatus as in claim 1, wherein said magnetic means comprises a magnet coupled to said pressure-responsive means; and
    magnetic material secured to said resonant element and operable with said magnet to develop a change in force on said resonant element as said magnet is moved by said pressure-responsive means.

18. Apparatus as in claim 17, wherein said magnetic material is aligned with pole pieces forming part of a magnetic circuit including said magnet.

19. Apparatus as in claim 1, wherein said resonant element is an elongate, transversely vibratable device.

20. Apparatus as in claim 19, wherein said resonant element is a tuning fork to which said force is applied longitudinally.

21. Apparatus as in claim 20, wherein said element is a double-tuning fork (DTF).

22. Apparatus as in claim 19, wherein said device is an etched planar structure.

23. Apparatus as in claim 22, wherein said device is secured at one end to said sealed housing;
    said magnetic means including means operable to apply said force to the other end of said device.

24. Apparatus as in claim 23, wherein said magnetic means includes first magnetic material forming part of said other end of said device; and
    second magnetic material outside of said housing adjacent said other end of said device to interact with said first magnetic material so as to transmit said force through said sealed housing.

25. Apparatus as in claim 24, wherein said second magnetic material comprises a magnet producing an inhomogeneous field.

26. Apparatus as in claim 25, wherein said first magnetic material is a metallic mass deposited on said structure.

27. Apparatus as in claim 26, wherein said magnet comprises pole pieces on opposite sides of said first magnetic material and arranged to develop a magnetic field which attracts said mass of magnetic material in a direction longitudinally of said device towards a central position between said pole pieces.

28. Apparatus as in claim 22, wherein said device is etched with transverse flexures;
   said flexures being secured to said housing so as to resist sideways movement of said device while accommodating longitudinal movement in response to changes in the force transmitted by said magnetic means.

29. Apparatus as in claim 1, including a casing forming a closed chamber;
   a liquid-fill in said chamber;
   said pressure-responsive means comprising a flexible member dividing said chamber into separate sections;
   means for applying said differential pressure to said liquid-fill so as to develop the differential pressure across said flexible member;
   an outer surface of said sealed housing being in contact with the liquid-fill in one of said sections; and
   means securing one part of said element to said sealed housing;
   said magnetic means being operable with said flexible member to transmit force to another part of said element to develop said responsive force in said element.

30. Apparatus as in claim 29, wherein said sealed housing is secured to said casing at a region of said housing which is adjacent said one part of said element;
   said magnetic means comprising a magnet outside of said housing and fixed to mechanical ground;
   said magnetic means further including a relatively light armature means movable by said flexible member and operable with said permanent magnet to transmit force to said other part of said element.

31. Apparatus as in claim 29, wherein said sealed housing is mechanically coupled to said flexible member and movable thereby;
   said magnetic means including means to restrain movement of said resonant element as said housing is moved, so as to develop said corresponding force in said element in response to the force transmitted from said flexible member to said sealed housing.

32. Apparatus as in claim 29, wherein said magnetic means comprises a first permanent magnet outside of said housing and movable by said flexible member; and
   a second permanent magnet inside of said housing and connected to said element;
   said first and second permanent magnets being aligned to provide for closely matched movements thereof.

* * * * *